United States Patent
Chang et al.

(10) Patent No.: US 12,491,933 B2
(45) Date of Patent: Dec. 9, 2025

(54) INDEPENDENT STEERING SYSTEM

(71) Applicants: Hyundai Motor Company, Seoul (KR); Kia Corporation, Seoul (KR)

(72) Inventors: Sehyun Chang, Suwon-Si (KR); Sang Woo Hwang, Seoul (KR); Min Jun Kim, Busan (KR); Young II Sohn, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 810 days.

(21) Appl. No.: 17/865,267

(22) Filed: Jul. 14, 2022

(65) Prior Publication Data
US 2023/0046848 A1 Feb. 16, 2023

(30) Foreign Application Priority Data
Aug. 12, 2021 (KR) .................. 10-2021-0106388

(51) Int. Cl.
*B62D 5/04* (2006.01)
*B60G 7/00* (2006.01)
*B62D 3/12* (2006.01)
*B62D 7/18* (2006.01)

(52) U.S. Cl.
CPC ........... *B62D 5/0418* (2013.01); *B60G 7/001* (2013.01); *B62D 3/12* (2013.01); *B62D 5/0457* (2013.01); *B62D 7/18* (2013.01)

(58) Field of Classification Search
CPC ........... B62D 7/06; B62D 5/0418; B62D 7/12
See application file for complete search history.

(56) References Cited

U.S. PATENT DOCUMENTS

| | | | |
|---|---|---|---|
| 6,974,138 B2 | 12/2005 | Perello et al. | |
| 10,759,416 B1 | 9/2020 | Funke et al. | |
| 11,148,493 B2* | 10/2021 | Riedel | B60G 3/06 |
| 11,548,552 B2* | 1/2023 | Chen | B62D 17/00 |
| 11,820,449 B2* | 11/2023 | Chang | B62D 7/06 |
| 12,252,199 B2* | 3/2025 | Chang | B62D 7/1545 |
| 2013/0333966 A1 | 12/2013 | Bryant | |
| 2015/0083509 A1 | 3/2015 | Borroni-Bird et al. | |
| 2019/0270356 A1 | 9/2019 | Swank, II | |

FOREIGN PATENT DOCUMENTS

| | | | | |
|---|---|---|---|---|
| CN | 106627746 | | 5/2017 | |
| CN | 106627746 A | * | 5/2017 | ........... B62D 5/0418 |
| CN | 108516013 | | 9/2018 | |
| CN | 108516013 A | * | 9/2018 | ........... B62D 5/0421 |
| CN | 109963768 | | 7/2019 | |

(Continued)

*Primary Examiner* — Valentin Neacsu
*Assistant Examiner* — Hosam Shabara
(74) *Attorney, Agent, or Firm* — Morgan Lewis & Bockius LLP (57) ABSTRACT

An independent steering system includes a knuckle fastened to inside of a wheel and driven integrally with the wheel, an upper arm fastened to an upper end portion of the knuckle, a lower arm fastened to a lower end portion of the knuckle, a steering motor positioned on the lower arm, and a steering gear portion having a first end portion connected to the steering motor and a second end portion engaged to the knuckle, wherein the steering gear portion rotates integrally with the knuckle by a rotation force of the steering motor.

11 Claims, 4 Drawing Sheets

(56) References Cited

FOREIGN PATENT DOCUMENTS

| | | |
|---|---|---|
| EP | 1912848 | 4/2008 |
| EP | 3600921 | 5/2021 |
| JP | 2007-118766 | 5/2007 |
| JP | 6546485 | 3/2017 |
| JP | 2017-124822 | 7/2017 |
| KR | 10-2004-0015950 | 2/2004 |
| KR | 10-2007-0103191 | 10/2007 |
| WO | WO 2007/006776 | 1/2007 |
| WO | WO 2018/177642 | 10/2018 |

* cited by examiner

[ CAMBER ANGLE (BUMP) ]

FIG. 6B

[ CAMBER ANGLE (UPON REBOUND) ]

INDEPENDENT STEERING SYSTEM

CROSS-REFERENCE TO RELATED APPLICATION

The present application claims priority to Korean Patent Application No. 10-2021-0106388 filed on Aug. 12, 2021, the entire contents of which is incorporated herein for all purposes by this reference.

BACKGROUND OF THE INVENTION

Field of the Invention

The present invention relates to an independent steering system, and more preferably, to an independent steering system, which performs the fastening of a steering motor and a steering gear part to improve a steering angle in a steering system configured to perform an independent steering of each vehicle wheel.

Description of Related Art

A conventional suspension system of a vehicle serves to prevent damage to a vehicle body or a cargo and to improve a ride comfort by connecting an axle and the vehicle body to prevent vibration or shock received by the axle from the road surface during traveling of the vehicle from being directly delivered to the vehicle body. Such a suspension system is composed of a suspension spring configured to alleviate the shock received from the road surface, a shock absorber configured to suppress the free vibration of the suspension spring to improve the ride comfort, and a stabilizer configured to suppress the rolling of the vehicle.

As a suspension system for a commercial vehicle, an integrated axle type suspension system in which the left and right vehicle wheels are connected to one axle is mainly used, and as the suspension spring, a leaf spring or an air spring is mainly used.

Meanwhile, a steering system for a commercial vehicle using the integrated axle type suspension system is composed of a pitman arm mounted on an output shaft of a steering gear to rotate, a drag link configured to deliver a motion of the pitman arm to a knuckle arm, the knuckle arm configured to receive a motion of the drag link to operate knuckle spins, and a tie rod connecting the left and right knuckle arms.

Figure 1:
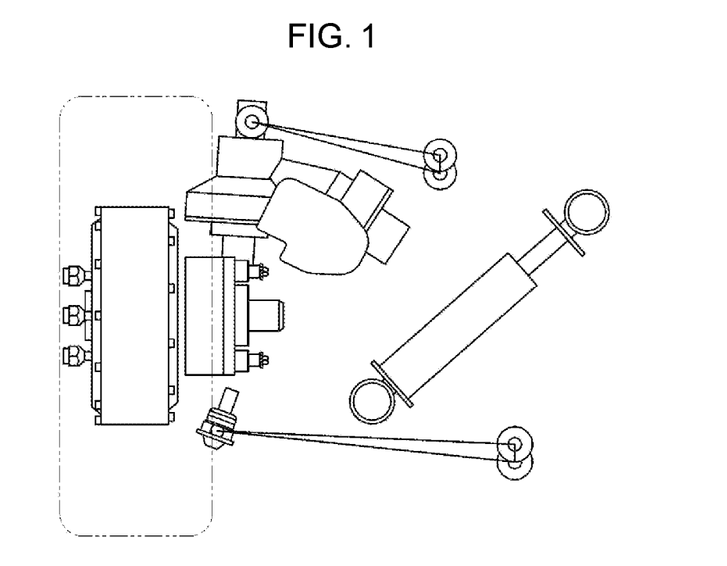
FIG. 1 illustrates a coupling relationship of a revo knuckle as the related art.

FIG. 1 illustrates a suspension system in which one end portion of the shock absorber is fixed to a vehicle body frame.

In a vehicle provided with the integrated axle type suspension system using the air spring and the steering system, the air spring serves to merely replace the leaf spring, and does not largely contribute to improving the ride comfort and the handing property and has difficulty in securing the degree of freedom of design due to the structural property in implementing the precise geometry.

Furthermore, recently, an independent steering type suspension system configured to input a steering angle of a wheel into each suspension system through a motor assembly is being developed. However, the independent steering type suspension system has a problem in stably delivering a rotation force applied from a steering motor to the knuckle and the wheel.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an independent steering system configured to provide a steering gear part fastened to a lower arm, and to apply a rotation force to a semicircular area of the steering gear part to rotate a knuckle.

Furthermore, various aspects of the present invention are directed to providing a fastening unit between the lower arm and the knuckle to provide a wider steering angle of the knuckle.

The objects of the present invention are not limited to the aforementioned objects, and other objects of the present invention not mentioned may be understood by the following description, and may be understood by the exemplary embodiment of the present invention more clearly. Furthermore, the objects of the present invention may be achieved by a means described in the claims and a combination thereof.

An independent steering system for achieving the object of the present invention includes the following configuration.

Various aspects of the present invention provide an independent steering system including a knuckle fastened to inside of a wheel and driven integrally with the wheel; an upper arm pivotally connected to an upper end portion of the knuckle; a lower arm pivotally connected to a lower end portion of the knuckle; a steering motor positioned on the lower arm; and a steering gear portion having a first end portion connected to the steering motor and a second end portion engaged to the knuckle, wherein the steering gear portion rotates integrally with the knuckle by a rotation force of the steering motor.

Furthermore, the independent steering system further includes a push rod having one end portion fastened to the lower arm and a crank pivotally connected to a second end portion of the push rod and a second end portion of the upper arm, and behaving integrally with a shock absorber.

Furthermore, the independent steering system further includes a fastening unit positioned between an upper end portion of the lower arm and the knuckle.

Furthermore, the fastening unit is fastened to one end portion of the steering gear portion, and having a vertical rotation axis with respect to the lower arm.

Furthermore, the fastening unit includes a universal joint fastening portion positioned on the knuckle and a universal joint rotation portion pivotally coupled to the lower arm and fixed to the steering gear portion, and having a vertical rotation axis with respect to the lower arm.

Furthermore, the universal joint fastening portion is configured to rotate in a predetermined angle in a width direction of a vehicle with respect to the universal joint rotation portion.

Furthermore, the steering gear portion has one end portion facing the steering motor in a semicircular shape.

Furthermore, the independent steering system further includes a bearing positioned between the steering gear portion and the lower arm.

The present invention may obtain the following effects by the aforementioned exemplary embodiment of the present invention, and the configuration, coupling, and use relationship to be described later.

The present invention may provide the knuckle integrally with rotated the steering gear portion with respect to the lower arm to provide the high degree of freedom of the suspension.

Furthermore, the present invention may include the fastening unit positioned between the lower arm and the knuckle to provide the structural stability configured for absorbing the vertical behavior applied to the wheel.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but further various alternatives, modifications, equivalents and other embodiments, which may be included within the spirit and scope of the present invention as defined by the appended claims.

Hereinafter, an exemplary embodiment of the present invention will be described in more detail with reference to the accompanying drawings. The exemplary embodiment of the present invention may be modified in various forms, and the scope of the present invention should not be construed as being limited to the following exemplary embodiment of the present invention. The exemplary embodiment of the present invention is provided to more completely explain various exemplary embodiments of the present invention to those skilled in the art.

Furthermore, terms such as " . . . knuckle", " . . . unit", " . . . part", etc. described in the specification mean a unit that processes at least one function or operation, which may be implemented by hardware, software, or a combination of hardware and software.

Hereinafter, the exemplary embodiment of the present invention will be described in detail with reference to the accompanying drawings, and in describing the contents with reference to the accompanying drawings, the same or corresponding components are denoted by the same reference numerals, and overlapping description thereof will be omitted.

The present invention relates to an independent steering system, and relates to a steering system configured for steering a knuckle 100 through a rotation force of a steering gear portion 500 positioned adjacent to a lower arm 300. A steering motor 400 and the steering gear portion 500 may be connected through a rack and pinion coupling.

Furthermore, since the independent steering system according to various exemplary embodiments of the present invention may be applied to each steering system including a wheel, a steering system mounted with one wheel will be described below as various exemplary embodiments of the present invention.

Figure 2:
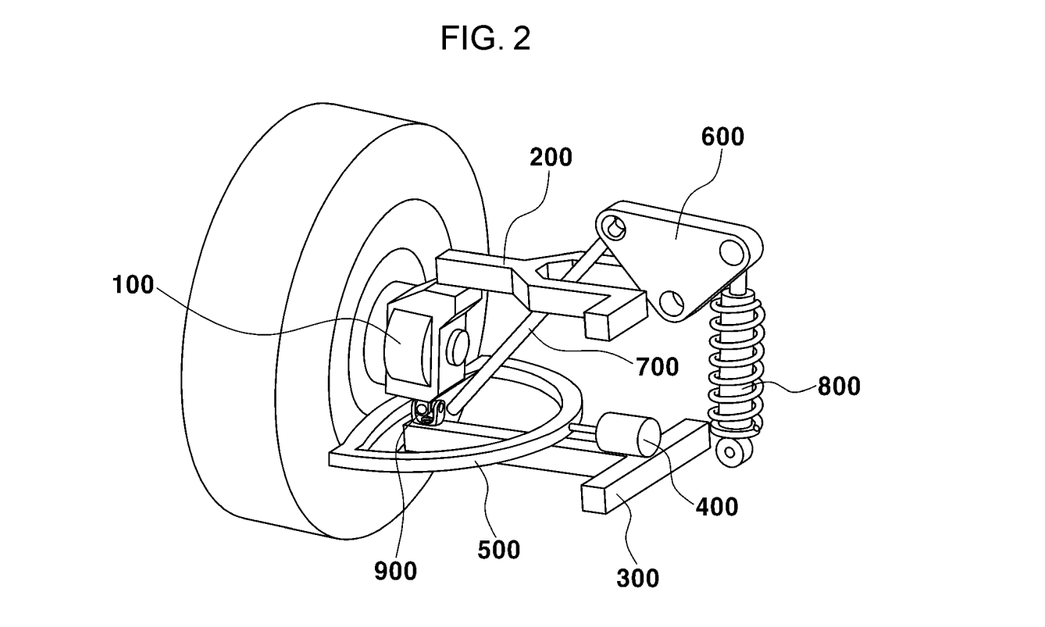
FIG. 2 illustrates a perspective diagram of an independent steering system as various exemplary embodiments of the present invention.

FIG. 2 illustrates a perspective diagram of an independent steering system as various exemplary embodiments of the present invention.

As illustrated, the independent steering system includes the knuckle 100 positioned inside the wheel, an upper arm 200 fastened on an upper end portion of the knuckle 100, and the lower arm 300 fastened to a lower end portion of the knuckle 100 and having the other end portion fixed to a vehicle body. The independent steering system includes a fastening unit 900 positioned between the lower arm 300 and the knuckle 100 and configured so that the knuckle 100 may apply a vertical rotation shaft with respect to the lower arm 300.

Furthermore, the fastening unit 900 is configured so that the knuckle 100 may be rotated in a width direction of the vehicle with respect to the lower arm 300.

A crank 600 is fastened to one end portion of a push rod 700 fastened to one end portion of the lower arm 300. Furthermore, the independent steering system includes a shock absorber 800 positioned between the crank 600 and the vehicle body. Furthermore, the crank 600 may be fastened to one end portion of the upper arm 200 and positioned.

According to the exemplary embodiment of the present invention, the crank 600 may include a fastening hole fastened to each of the push rod 700, the upper arm 200, and the shock absorber 800, and the crank 600 including three fastening holes may have an inverted triangular shape forming each fastening hole as a vertex.

Furthermore, among three fastening holes, the fastening hole closest to the vehicle body is fastened to the shock absorber 800, the fastening hole positioned on the lowermost end portion may be fastened to the upper arm 200, and the fastening hole closest to the wheel may be fastened to the push rod 700. As described above, each configuration fastened to the crank 600 is made such that the shock introduced into the wheel may be delivered to the shock absorber 800 if the vertical shock, such as the bump state or rebound state of the wheel, is applied.

The steering motor 400 positioned on the lower arm 300 is fastened to the steering gear portion 500 and one surface of the lower arm 300, and the rotation force of the steering motor 400 is applied to the steering gear portion 500 and the steering gear portion 500 is rotated integrally with the knuckle 100. Therefore, the steering angle may be applied to the wheel.

Furthermore, one end portion of the steering gear portion 500 close to the knuckle 100 is configured to be fixed to the fastening unit 900, in which the fastening unit 900 includes a universal joint fastening portion 910 positioned between the lower arm 300 and the knuckle 100 and fastened to the knuckle 100 and a universal joint rotation portion 920 positioned on an upper surface of the lower arm 300 and fastened to the steering gear portion 500.

Therefore, if the rotation force is applied from the steering motor 400, one end portion of the steering gear portion 500 facing the steering motor 400 is rotated, and the universal joint rotation portion 920 and the knuckle 100 are configured to be integrally rotated in response to the rotation of the steering gear portion 500.

Furthermore, the independent steering system includes the universal joint fastening portion 910 configured for providing a change in the angle formed by the wheel and the lower arm 300 with respect to the universal joint rotation portion 920. Therefore, the universal joint fastening portion 910 is configured to change the angle formed by the knuckle 100 and the lower arm 300.

In other words, the universal joint fastening portion 910 is configured to be rotatable by a predetermined angle in the width direction of the vehicle with respect to the universal joint rotation portion 920.

Furthermore, since the universal joint fastening portion 910 is positioned in a state of being fixed to the knuckle 100, and the universal joint rotation portion 920 is configured to be rotatable with respect to the height-directional rotation shaft of the lower arm 300, the universal joint rotation portion 920 may be integrally rotated in response to the rotation of the steering gear portion 500.

As described above, the universal joint rotation portion 920 is configured to be rotatable with respect to the height direction of the lower arm 300, and the knuckle 100 and the universal joint rotation portion 920 are integrally rotated in response to the rotation of the steering gear portion 500.

Furthermore, since the angle of the universal joint fastening portion 910 may be changed with respect to the universal joint rotation portion 920 positioned on the lower arm 300, the upper end portion of the knuckle 100 is configured to be movable in the width direction of the vehicle.

A control unit may apply power to the steering motor 400 from a battery positioned in the vehicle to apply the rotation force of the steering motor 400 in response to the request for the steering angle determined by a user or the control unit, and receive amounts of rotation of the steering gear portion 500 and the knuckle 100.

Figure 3:
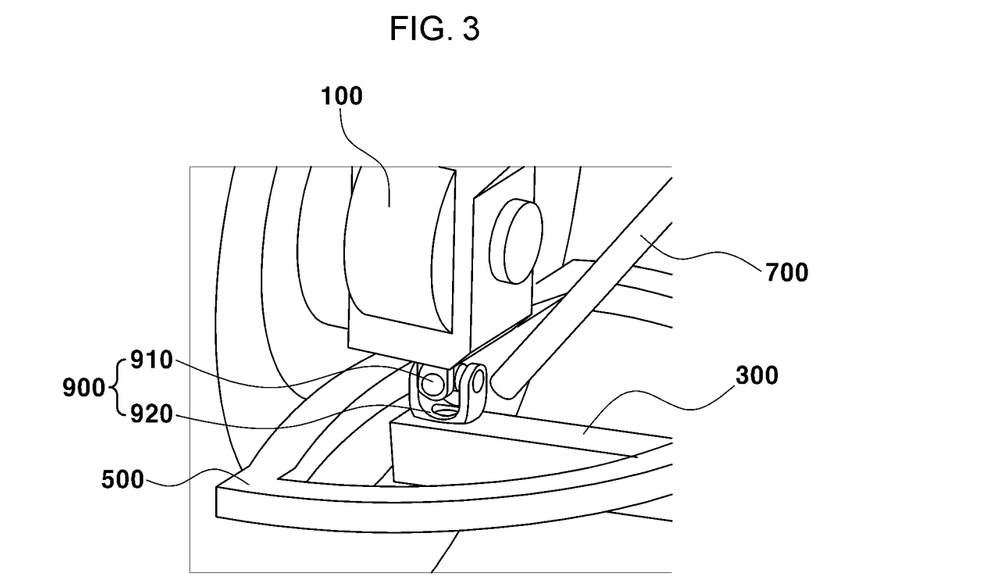
FIG. 3 illustrates an enlarged diagram of the independent steering system as the exemplary embodiment of the present invention.

FIG. 3 illustrates an enlarged diagram of the independent steering system as the exemplary embodiment of the present invention.

The independent steering system includes the knuckle 100 positioned on an internal surface of the wheel mounted with the tire, and the upper arm 200 and the lower arm 300 fastened to each of the upper and lower end portions of the knuckle 100. The independent steering system includes the fastening unit 900 at a position where the lower arm 300 and the knuckle 100 face, and includes the steering gear portion 500 at a position close to the fastening unit 900 and a lower surface of the knuckle 100.

The steering gear portion 500 is configured so that a semicircular one end portion formed inside the steering gear portion 500 is gear-fastened to the steering motor 400 such that the rotation force of the steering motor 400 is applied. Therefore, the steering gear portion 500 is configured to be rotated around the fastening unit 900 in response to clockwise directional and counterclockwise directional rotations of the steering motor 400. The universal joint rotation portion 920 of the fastening unit 900 and the steering gear portion 500 are fixed, and the semicircular one end portion of the steering gear portion 500 is moved by the steering motor 400 in the width direction of the vehicle and therefore, the universal joint rotation portion 920 is integrally rotated with the other end portion of the steering gear portion 500.

Therefore, the universal joint fastening portion 910 is configured to be rotated with respect to the universal joint rotation portion 920, and the knuckle 100 is configured to be rotated along the rotation angle of the steering gear portion 500.

The universal joint rotation portion 920 is configured to be rotated along the height directional center axis extends along the upper surface of the lower arm 300, and the universal joint fastening portion 910 fastened to the universal joint rotation portion 920 is configured so that the upper end portion of the knuckle 100 may be moved in the width direction thereof.

Furthermore, if the universal joint rotation portion 920 is rotated by the steering motor 400, the universal joint rotation portion 920 is configured to be rotated integrally with the knuckle 100 and configured to input the steering angle into the knuckle 100.

Figure 4:
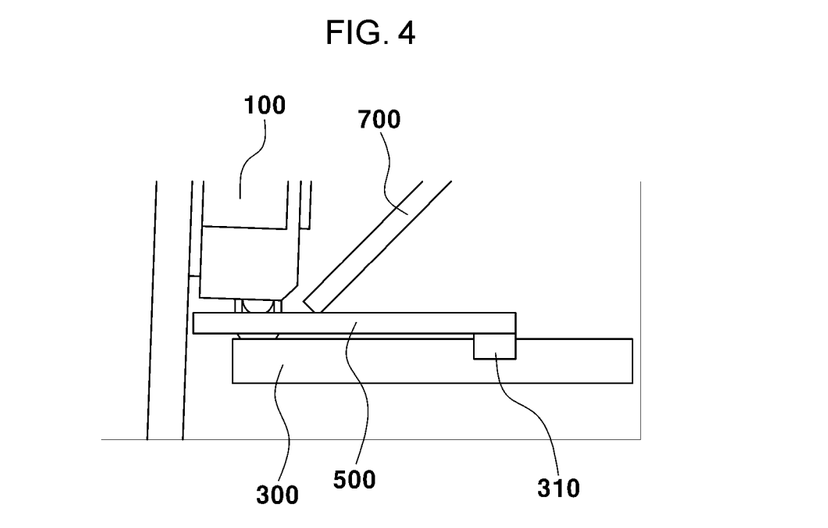
FIG. 4 illustrates a side diagram of the independent steering system as the exemplary embodiment of the present invention.

FIG. 4 is a side diagram illustrates the coupling relationship between the fastening unit 900, the lower arm 300, and the steering gear portion 500.

The independent steering system includes the fastening unit 900 positioned between the lower arm 300 and the knuckle 100, and includes the steering gear portion 500 fixed to a side surface of one end portion of the fastening unit 900 close to the knuckle 100. One end portion of the steering gear portion 500 positioned in contact with the steering motor 400 has the semicircular shape, and the other end portion thereof is configured to be in contact with the universal joint rotation portion 920 of the fastening unit 900.

One end portion where the steering gear portion 500 and the lower arm 300 face includes a bearing 310, and one end portion having the semicircular shape of the steering gear portion 500 is configured to be moved in a longitudinal direction of the vehicle in contact with the steering motor 400. Therefore, the steering gear portion is configured such that one end portion thereof having the semicircular shape is rotated with respect to the fastening unit 900.

In other words, the bearing 310 is positioned between the lower arm 300 and the steering gear portion 500, and configured to reduce friction generated with the lower arm 300 if the steering gear portion 500 is moved by the steering motor 400.

Figure 5A:
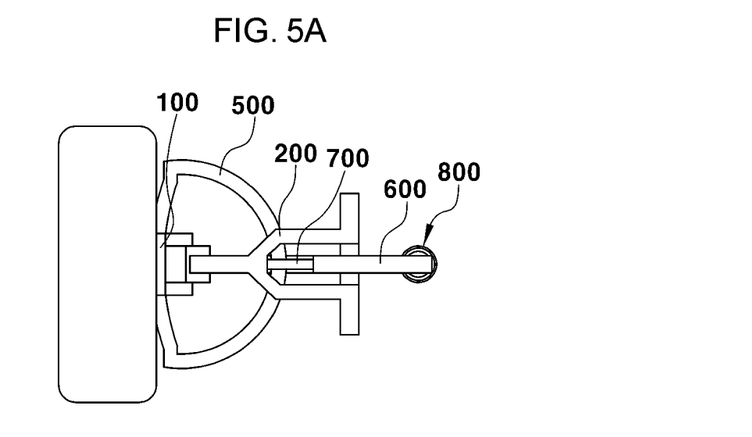
FIG. 5A illustrates a top diagram of a state where a steering angle of the independent steering system is 0 degree as the exemplary embodiment of the present invention.
Figure 5B:
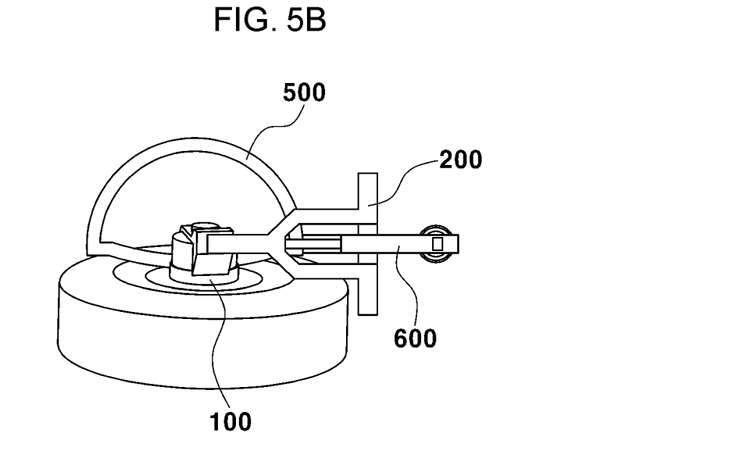
FIG. 5B illustrates a top diagram of a state where a steering angle of the independent steering system is 90 degrees to the left as the exemplary embodiment of the present invention.
Figure 5C:
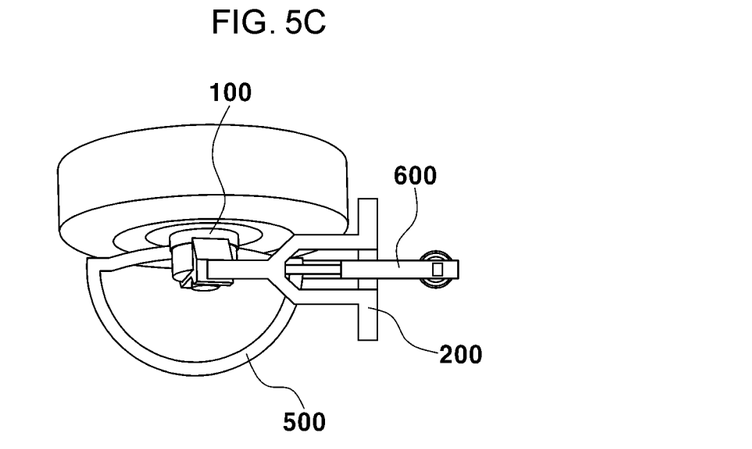
FIG. 5C illustrates a top diagram of a state where a steering angle of the independent steering system is 90 degrees to the right as the exemplary embodiment of the present invention.

FIG. 5A, FIG. 5B, and FIG. 5C are top diagrams illustrating moving states of the steering gear portion 500 and the wheel as the steering angle is input.

FIG. 5A illustrates a state diagram of a state where the steering angle of 0 degree is applied to the independent steering system as the exemplary embodiment of the present invention.

In the independent steering system having the steering angle of 0 degree, the steering gear portion 500 maintains the initial state. Furthermore, a state where the center portion of one end portion having the semicircular shape of the steering gear portion 500 and the steering motor 400 are fastened may be maintained.

In comparison, FIG. 5B illustrates a state where the steering gear portion 500 is controlled to have the steering angle of 90 degrees to the left, and the state illustrated in FIG. 5A is switched to a state where the steering motor 400 is fastened to the longitudinal end portion of the semicircular shape of the steering gear portion 500.

Furthermore, FIG. 5C illustrates a state where the steering gear portion 500 is controlled to have the steering angle of 90 degrees to the right, and the state illustrated in FIG. 5A is switched to a state where the steering motor 400 is fastened to the other end portion of the semicircular shape of the steering gear portion 500.

As described above, the steering gear portion 500 may be rotated 90 degrees in the left and right directions in response to the rotation force applied from the steering motor 400, and the steering angle responding to the rotation angle may be set by the knuckle 100 rotated integrally with the steering gear portion 500.

Furthermore, as the wheel having the left and right rotation angles is rotated integrally with the steering gear portion 500 with respect to the lower arm 300 where the universal joint rotation portion 920 is positioned, it is possible to provide the free steering angle in an area not interfering with the upper arm 200 and the lower arm 400.

Figure 6A:
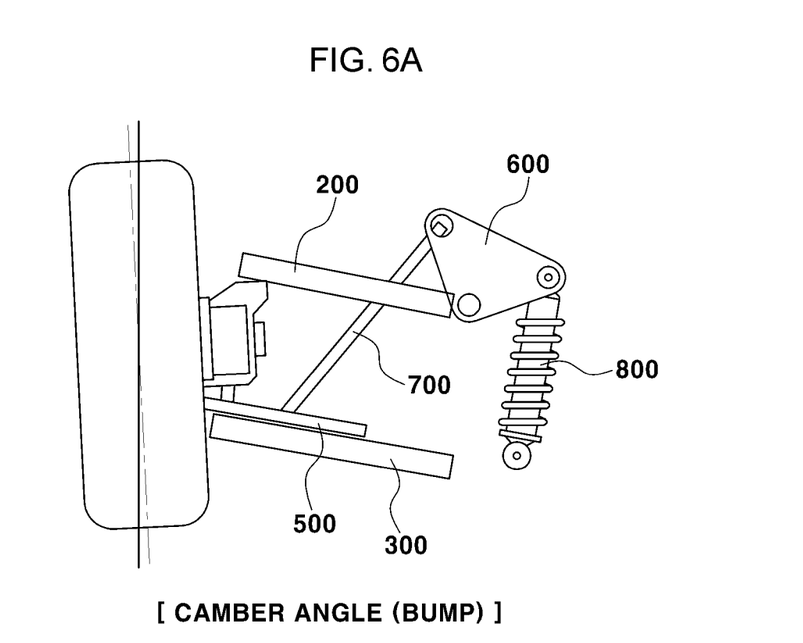
FIG. 6A illustrates a structure when a wheel is bumped as the exemplary embodiment of the present invention.
Figure 6B:
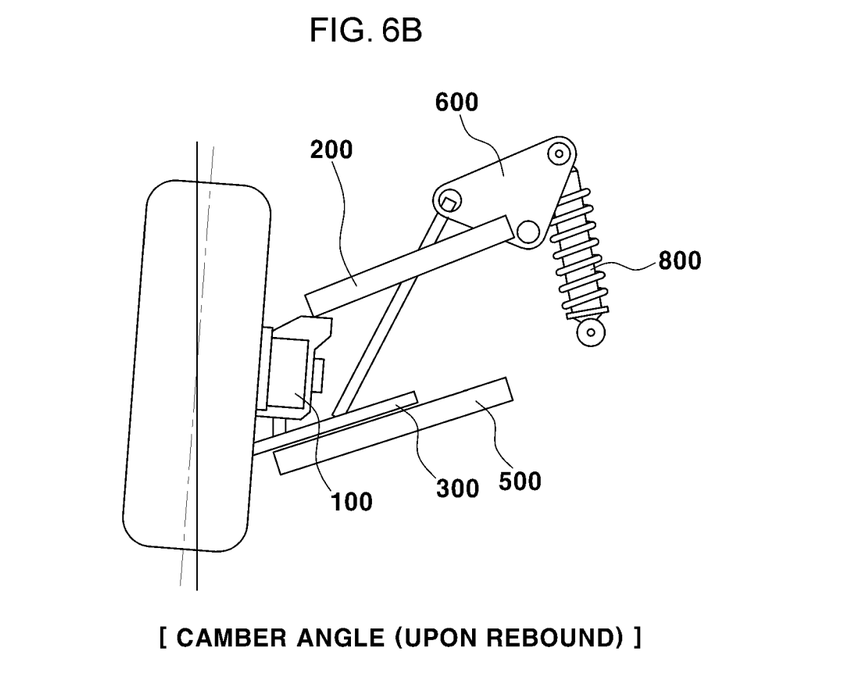
FIG. 6B illustrates a structure when the wheel is rebounded as the exemplary embodiment of the present invention.

FIG. 6A and FIG. 6B are side diagrams of the vehicle illustrating a configuration of the independent steering system when the vehicle is bumped and rebounded.

FIG. 6A illustrates a state where the steering system is bumped, and a camber angle of the wheel is positioned to face the internal surface of the vehicle in the bumped state. Furthermore, the lower arm 300 and the upper arm 200 are switched to a state where one end portions facing the knuckle 100 are raised to correspond to the camber angle.

Furthermore, the upper end portion of the knuckle 100 is rotated and moved to the outside of the vehicle with respect to the universal joint fastening portion 910, and an angle between the universal joint fastening portion 910 and the knuckle 100 is applied to correspond to the camber angle.

Furthermore, one end portion of the upper arm 200 fastened to the knuckle 100 is moved in the height direction of the vehicle and to the outside of the vehicle depending upon the bump, and the crank 600 positioned to be fastened to the other end portion of the upper arm 200 is configured to relatively move downward to a position close to the outside of the vehicle with respect to the fastening hole fastened to the push rod 700. The shock absorber 800 is configured to be compressed in response to the thus moved crank 600 to absorb the shock occurring in the steering system due to the bump.

In comparison, FIG. 6B illustrates a side cross-sectional diagram of the rebounded steering system.

In case of the rebounded steering system, the wheel is switched to a position facing the outside of the vehicle by being compared with the camber angle in the horizontal state. In case of the rebounded steering system, the lower arm 300 and the upper arm 200 fastened to the knuckle 100 are configured to move downward. Furthermore, the knuckle 100 has an angle smaller than 90 degrees with respect to the universal joint fastening portion 910 fastened to the lower arm 300.

Furthermore, one end portion of the upper arm 200 fastened to the knuckle 100 is moved downwards from the vehicle and to the interior of the vehicle depending upon the rebound, and the crank 600 positioned to be fastened to the other end portion of the upper arm 200 is configured to relatively move upward to a position close to the interior of the vehicle with respect to the fastening hole fastened to the push rod 700. The shock absorber 800 is configured to extend to absorb the shock occurring in the steering system due to the rebound in response to the thus moved crank 600.

In other words, the present steering system is configured such that the shock occurring upon bump and rebound applied to the wheel is delivered to the shock absorber 800 through the crank 600, and a change in the angle caused between the lower arm 300 and the knuckle 100 may be configured to be applied through the universal joint fastening portion 910.

Therefore, if the bump or the rebound occurs as the change in the height direction, the wheel may be configured to change the angle formed by the knuckle 100 and the universal joint fastening portion 910, and to absorb the shock introduced by changing the relative position of the crank 600.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An independent steering system comprising:
   a knuckle fastened to inside of a wheel and driven integrally with the wheel;
   an upper arm, a first end portion of which is pivotally connected to an upper end portion of the knuckle;
   a lower arm pivotally connected to a lower end portion of the knuckle;
   a steering motor; and
   a steering gear portion having a first end portion connected to the steering motor and a second end portion engaged to the knuckle, wherein the steering gear portion rotates integrally with the knuckle by a rotation force of the steering motor,
   wherein the steering gear portion includes one end portion facing the steering motor in a semicircular shape.

2. The independent steering system of claim 1, wherein the steering motor is positioned on the lower arm.

3. The independent steering system of claim 1, wherein the knuckle is rotated in a predetermined rotation angle of the steering gear portion, when the steering gear portion is rotated by the steering motor.

4. The independent steering system of claim 1, wherein a rotation shaft of the steering motor and the steering gear portion are engaged to each other through a rack and a pinion.

5. The independent steering system of claim 1, further including:
   a push rod having a first end portion pivotally connected to the lower arm; and
   a crank pivotally connected to a second end portion of the push rod and a second end portion of the upper arm.

6. The independent steering system of claim 5, wherein the crank is connected to a shock absorber.

7. The independent steering system of claim 1, further including:
   a fastening unit positioned between an upper end portion of the lower arm and the knuckle.

8. The independent steering system of claim 7, wherein the fastening unit is fastened to one end portion of the steering gear portion, and has a vertical rotation axis with respect to the lower arm.

9. The independent steering system of claim 8, wherein the fastening unit includes:
   a universal joint fastening portion coupled to the knuckle; and
   a universal joint rotation portion engaged to the universal joint fastening portion, wherein the universal joint rotation portion is pivotally coupled to the lower arm, is fixed to the steering gear portion, and has the vertical rotation axis with respect to the lower arm.

10. The independent steering system of claim 9, wherein the universal joint fastening portion is configured to rotate in a predetermined angle in a width direction of a vehicle with respect to the universal joint rotation portion.

11. The independent steering system of claim 1, further including:
    a bearing positioned between the steering gear portion and the lower arm.

* * * * *